US011418676B2

United States Patent
Terada

(10) Patent No.: US 11,418,676 B2
(45) Date of Patent: Aug. 16, 2022

(54) IMAGE FORMING APPARATUS WITH CLOUD PROCESSING AND CONTROL METHOD THEREFOR

(71) Applicant: TOSHIBA TEC KABUSHIKI KAISHA, Tokyo (JP)

(72) Inventor: Tomoki Terada, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/998,932

(22) Filed: Aug. 20, 2020

(65) Prior Publication Data
US 2021/0306513 A1 Sep. 30, 2021

(30) Foreign Application Priority Data
Mar. 25, 2020 (JP) .............................. JP2020-053680

(51) Int. Cl.
*H04N 1/32* (2006.01)
*H04N 1/04* (2006.01)
*H04N 1/00* (2006.01)
*H04N 1/417* (2006.01)

(52) U.S. Cl.
CPC ..... *H04N 1/32149* (2013.01); *H04N 1/00331* (2013.01); *H04N 1/0417* (2013.01); *H04N 1/32336* (2013.01); *H04N 1/417* (2013.01)

(58) Field of Classification Search
None
See application file for complete search history.

(56) References Cited

U.S. PATENT DOCUMENTS

| 2009/0161970 A1* | 6/2009 | Harada | H04N 1/41 |
| | | | 382/232 |
| 2010/0111301 A1* | 5/2010 | Wanderley | G06F 21/64 |
| | | | 380/243 |
| 2015/0281501 A1* | 10/2015 | Araki | H04N 1/00973 |
| | | | 358/1.13 |
| 2018/0032871 A1* | 2/2018 | Holt | G06N 3/084 |
| 2019/0114122 A1* | 4/2019 | Tani | G06F 3/1255 |
| 2019/0251707 A1* | 8/2019 | Gupta | G06T 9/002 |

FOREIGN PATENT DOCUMENTS

| WO | WO-2018/189613 | 10/2018 |
| WO | WO-2019/093268 | 5/2019 |

* cited by examiner

*Primary Examiner* — Miya J Williams
(74) *Attorney, Agent, or Firm* — Foley & Lardner LLP

(57) ABSTRACT

An image forming apparatus includes a communication interface, an encoder, and a processor. The communication interface communicates with a cloud server that executes decoding by any of a plurality of decoding methods corresponding to a plurality of autoencoder models. The encoder performs encoding by any of a plurality of encoding methods corresponding to the plurality of autoencoder models. The processor specifies an encoding method to the encoder to encode image data into intermediate layer data that is configured to be decoded by the cloud server and transmits the intermediate layer data and model information indicating the specified encoding method used for the encoding to the cloud server through the communication interface.

10 Claims, 4 Drawing Sheets

IMAGE FORMING APPARATUS WITH CLOUD PROCESSING AND CONTROL METHOD THEREFOR

CROSS-REFERENCE TO RELATED APPLICATION

This application is based upon and claims the benefit of priority from Japanese Patent Application No. 2020-053680, filed Mar. 25, 2020, the entire contents of which are incorporated herein by reference.

FIELD

Embodiments described herein relate generally to an image forming apparatus and a control method of an image forming apparatus.

BACKGROUND

An image forming apparatus executes printing in response to a print request. The image forming apparatus forms an image on a conveyance unit that conveys a paper sheet such as paper, and the paper sheet and discharges the paper sheet on which the image is formed. Further, the image forming apparatus can read a paper sheet (e.g., an original document) and generate image data.

The image forming apparatus can cause a cloud server to perform various processes on image data by transmitting the acquired image data to the cloud server. However, depending on the process executed by the cloud server, high-resolution image data may be required. Therefore, the image forming apparatus needs to transmit high-resolution image data to the cloud server, which causes a problem in that a communication load increases.

DETAILED DESCRIPTION

One of the problems solved by the present disclosure is providing an image forming apparatus and a control method of an image forming apparatus, which can reduce a communication load.

In general, according to one embodiment, the image forming apparatus includes a communication interface, an encoder, and a processor. The communication interface communicates with a cloud server that executes decoding by any of a plurality of decoding methods corresponding to a plurality of autoencoder models. The encoder executes encoding by any of a plurality of encoding methods corresponding to the plurality of autoencoder models. The processor specifies an encoding method to the encoder to encode image data into intermediate layer data that is decoded by the cloud server and transmits the intermediate layer data and model information indicating the encoding method used for the encoding to the cloud server via the communication interface.

Figure 1:
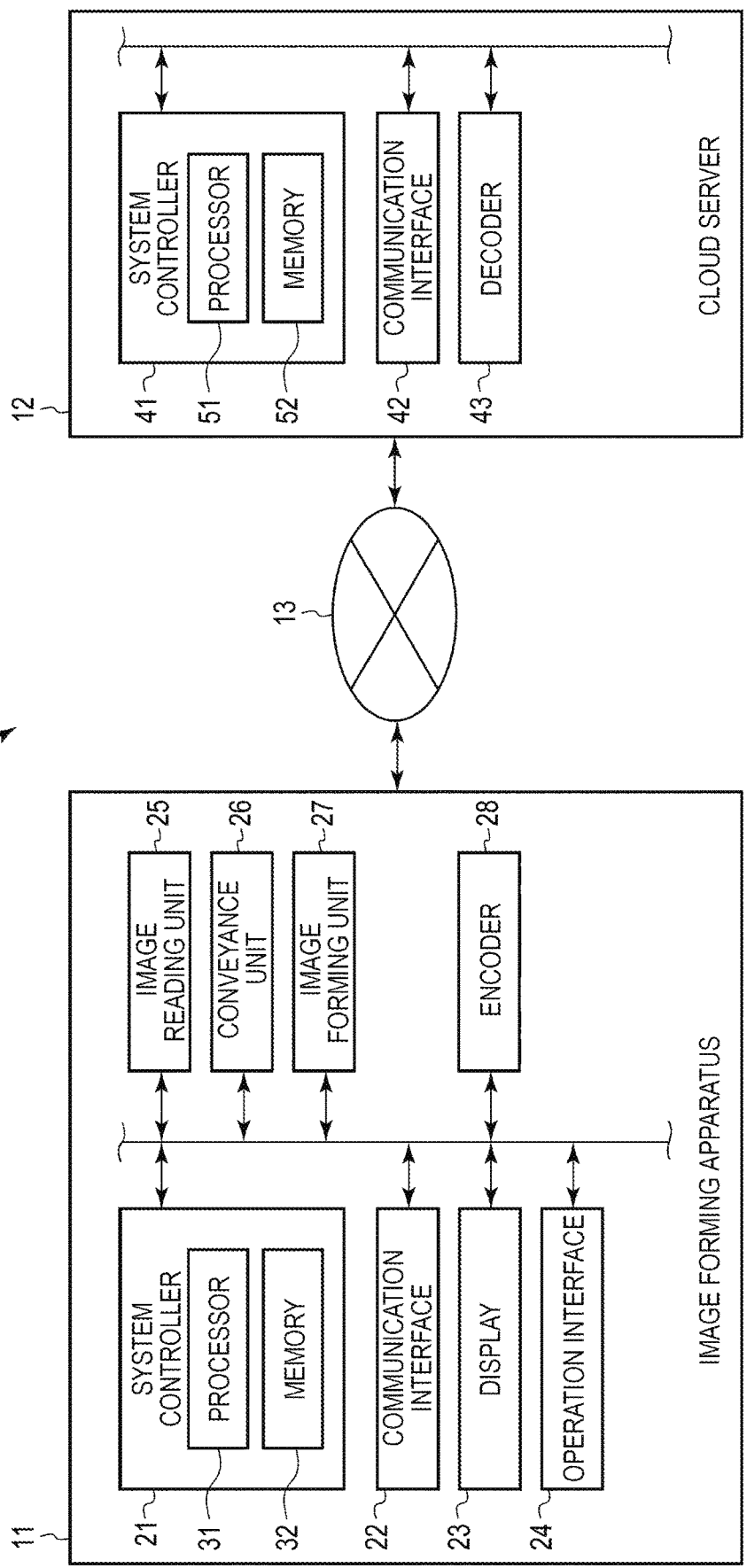
FIG. 1 is a diagram illustrating a configuration example of an image forming apparatus and a cloud server according to an embodiment.

Hereinafter, embodiments will be described with reference to the drawings. FIG. 1 is an explanatory diagram for illustrating an example of an image processing system 1 according to at least one embodiment.

The image processing system 1 includes an image forming apparatus 11 and a cloud server 12. The image forming apparatus 11 and the cloud server 12 are connected to each other via a network 13 such as a public line. The image processing system 1 is a system in which the image forming apparatus 11 transmits image data to the cloud server 12, executes processing based on the image data received by the cloud server 12, and transmits the processing result to the image forming apparatus 11.

At least one embodiment relates to an example in which, in the image processing system 1, the image forming apparatus 11 transmits image data to the cloud server 12 and executes optical character recognition (OCR) processing based on the image data received by the cloud server 12.

Further, in at least one embodiment, the image forming apparatus 11 will be described as an apparatus that compresses image data using an autoencoder and transmits the compressed image data to the cloud server 12.

The image forming apparatus 11 is, for example, a multifunction printer (MFP) that performs various processes such as image formation while conveying a recording medium such as a print medium. The image forming apparatus 11 is, for example, a solid-state scanning type printer (for example, an LED printer) that scans an LED array that performs various processes such as image formation while conveying a recording medium such as a print medium. The image forming apparatus 11 may be an inkjet type printer (i.e., an inkjet printer) that scans an inkjet head that ejects ink, or another type printer.

The image forming apparatus 11 forms an image on a print medium with toner. Further, the image forming apparatus 11 acquires an image (e.g., image data) of a paper sheet by optically reading the paper sheet. Further, the image forming apparatus 11 can transmit the image (e.g., image data) read from the paper sheet to an external device such as the cloud server 12 via the network 13.

The cloud server 12 is a server device including a processor, a memory, and a communication interface. The cloud server 12 executes image processing (e.g., OCR processing) by the processor executing a program in the memory. For example, when the cloud server 12 receives the image data from the image forming apparatus 11, the cloud server 12 analyzes the image data by the OCR processing and generates a document file based on the character recognition result. The cloud server 12 transmits the generated document file to the image forming apparatus 11.

First, the configuration of the image forming apparatus 11 will be described. The image forming apparatus 11 includes a system controller 21, a communication interface 22, a display 23, an operation interface 24, an image reading unit (image reader) 25, a conveyance unit (conveyor) 26, an image forming unit 27, and an encoder 28. The system controller 21, the communication interface 22, the display 23, the operation interface 24, the image reading unit 25, the conveyance unit 26, the image forming unit 27, and the encoder 28 are housed in a housing (not shown).

The system controller 21 controls the image forming apparatus 11. The system controller 21 includes, for example, a processor 31 and a memory 32.

The processor 31 is an arithmetic element (for example, a CPU) that executes arithmetic processing. The processor 31 is the main body of the operation of the system controller 21. The processor 31 performs various processes based on data such as programs or the like stored in the memory 32. The processor 31 functions as a control unit that can execute various operations by executing a program stored in the memory 32. The processor 31 is configured with a lower specification than the processor installed in the cloud server 12. As a result, the cost of the image forming apparatus 11 can be suppressed.

The memory 32 is a storage device that stores programs and data used in the programs. Further, the memory 32 temporarily stores data being processed by the processor 31 and the like. The memory 32 is configured as a non-volatile memory.

The communication interface 22 is an interface for communicating with a client device that supplies a print job via a network. Further, the communication interface 22 transmits image data to the cloud server 12 via the network 13. Further, the communication interface 22 acquires the processing result from the cloud server 12 via the network 13.

The display 23 displays a screen according to a video signal input from the display control unit such as the system controller 21 or a graphic controller (not shown). For example, the display 23 displays screens for various settings of the image forming apparatus 11.

The operation interface 24 (e.g., an operator interface, a user interface) includes various operation members (e.g., configured to receive operator inputs or user inputs). The operation interface 24 supplies an operation signal corresponding to the operation of the operation member to the system controller 21. The operation member is, for example, a touch sensor, a numeric keypad, a power key, a paper feed key, various function keys, or a keyboard. The touch sensor is, for example, a resistive film type touch sensor, a capacitance type touch sensor, or the like. The touch sensor acquires information indicating a designated position in a certain area. The touch sensor is configured as a touch panel integrally with the display 23 to input a signal indicating the touched position on the screen displayed on the display 23 to the system controller 21.

The image reading unit 25 reads an image from a paper sheet. The image reading unit 25 includes, for example, a scanner and an automatic document feeder (ADF). The scanner includes an image sensor and an optical system. The scanner images the reflected light of the light emitted to the paper sheet on the image sensor by the optical system. The scanner reads the electric charge accumulated in the image sensor by the light imaged by the optical system, converts the electric charge into a digital signal, and generates image data of the paper sheet. The scanner reads the paper sheet from the side of the glass plate on which the paper sheet is arranged that faces the paper sheet. The image reading unit 25 acquires an image of the entire paper sheet by acquiring an image with the scanner while moving the scanner. Further, the image reading unit 25 acquires an image of the entire paper sheet by acquiring an image with the scanner while passing the paper sheet through the reading position of the scanner by the ADF, for example.

The conveyance unit 26 supplies a medium for printing (e.g., a print medium, such as a sheet) to the image forming unit 27 and discharges the print medium on which the image is formed by the image forming unit 27 from the housing. The conveyance unit 26 supplies the print medium stored in a sheet feed cassette (not shown) that stores the print medium to the image forming unit 27 one by one. Further, the conveyance unit 26 discharges the print medium on which the image is formed by the image forming unit 27 to a sheet discharge tray outside the housing.

The image forming unit 27 (e.g., a printer) forms an image on a print medium under the control of the system controller 21. The image forming unit 27 includes a photosensitive drum, a charger, an exposing device, a developing device, a transfer mechanism, and a fixing device. The image forming unit 27 charges the photosensitive drum by the charger and irradiates the photosensitive drum with light according to the image data for printing by the exposing device. As a result, an electrostatic latent image is formed on the photosensitive drum. The image forming unit 27 attaches toner to the latent image formed on the photosensitive drum by the developing device and transfers the toner attached to the latent image to the print medium by the transfer mechanism. The image forming unit 27 fixes the toner image on the print medium by the fixing device applying heat and pressure to the print medium to which the toner is transferred.

The image forming unit 27 may include a photosensitive drum, a charger, an exposing device, and a developing device, for toner of a color. The toner color is, for example, cyan (C), magenta (M), yellow (Y), black (K), or the like. The image forming unit 27 forms a color image on the medium by fixing the toner images of CMYK colors on the medium.

The encoder 28 encodes information by a predetermined encoding method. The encoder 28 performs the same process as an encoder network (e.g., an encoding portion) in an autoencoder using a neural network. The encoder 28 executes encoding by any of a plurality of encoding methods corresponding to a plurality of autoencoder models.

Next, the configuration of the cloud server 12 will be described. The cloud server 12 includes a system controller 41, a communication interface 42, and a decoder 43.

The system controller 41 controls the cloud server 12. The system controller 41 includes, for example, a processor 51 and a memory 52.

The processor 51 is an arithmetic element (for example, a CPU) that executes arithmetic processing. The processor 51 is the main body of the operation of the system controller 41. The processor 51 performs various processes based on data such as programs or the like stored in the memory 52. The processor 51 functions as a control unit capable of executing various operations by executing the program stored in the memory 52. The processor 51 is configured with a higher specification (e.g., greater processing power) than the processor 31 mounted in the image forming apparatus 11. As a result, it is possible to execute processing with a higher load than the image forming apparatus 11.

The memory 52 is a storage device that stores programs and data used in the programs. Further, the memory 52 temporarily stores data being processed by the processor 51 and the like. The memory 52 is configured as a non-volatile memory.

The communication interface 42 is a component for communicating with the image forming apparatus 11 via the network 13. The communication interface 42 acquires image data from the image forming apparatus 11 via the network 13. Further, the communication interface 42 transmits the OCR processing result (for example, a document file) to the image forming apparatus 11 via the network 13.

The decoder 43 decodes information by a predetermined decoding method. The decoder 43 performs the same process as a decoding network (e.g., a decoding portion) in an autoencoder using a neural network. The decoder 43 executes decoding by any of a plurality of decoding methods corresponding to a plurality of autoencoder models.

Next, the autoencoder in the image processing system 1 having the above configuration will be described.

Figure 2:
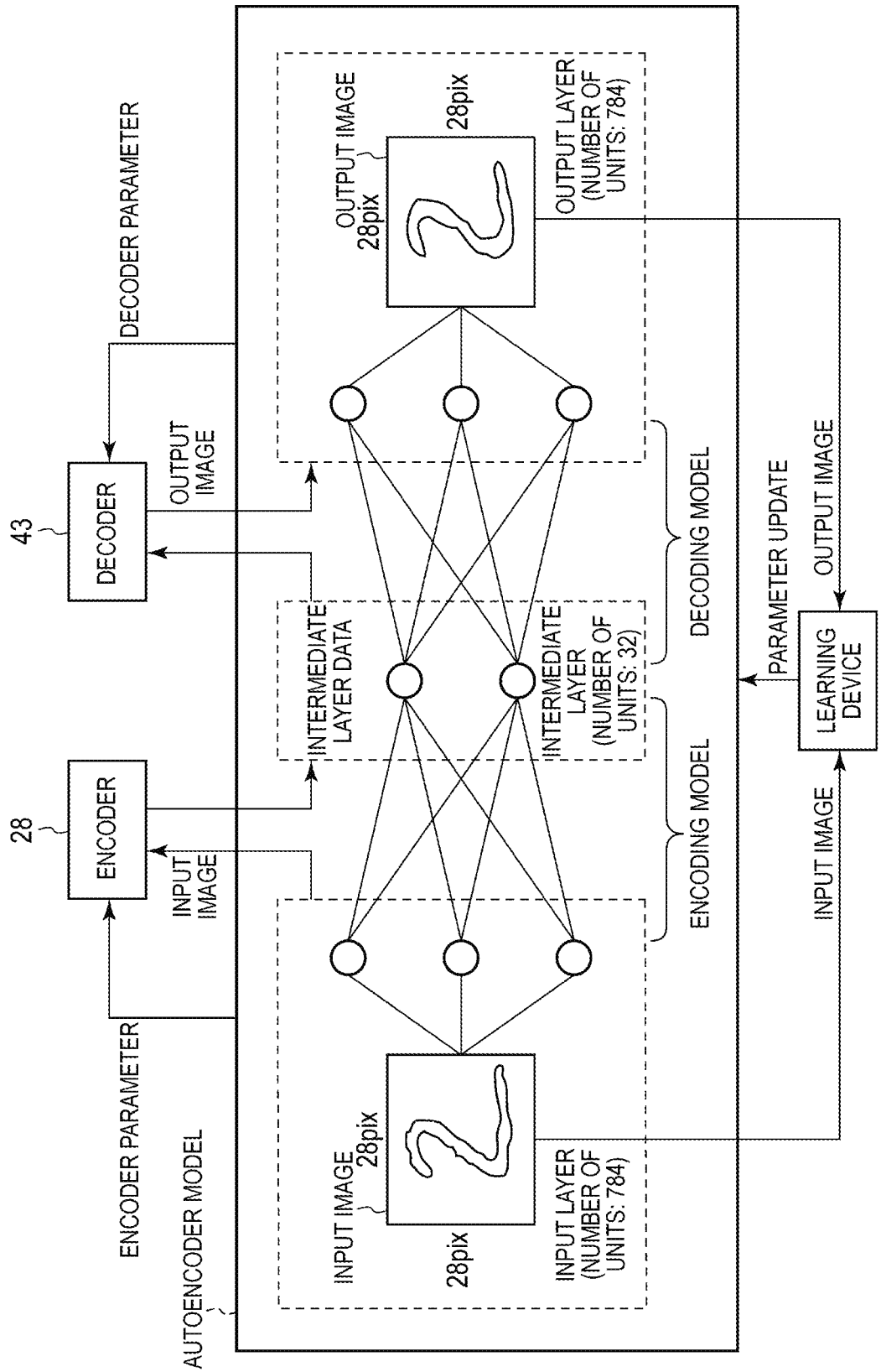
FIG. 2 is an explanatory diagram illustrating an autoencoder model.

FIG. 2 is an explanatory diagram for illustrating an example of a model of an autoencoder (e.g., an autoencoder model). The autoencoder is a dimensional compression method using the structure of a neural network.

The autoencoder model is configured of a plurality of layers including at least an input layer, an output layer, and an intermediate layer. The input layer, the output layer, and the intermediate layer each include a plurality of units (e.g., pixels). The intermediate layer is configured of a smaller number of units than the input layer and the output layer. The intermediate layer may be configured of a plurality of layers. Also, the number of units in the output layer is configured to match the number of units in the input layer.

The autoencoder model is one in which parameters (e.g., bias and weight) between different layers are set. The autoencoder model includes an encoder parameter (e.g., an encoder model) and a decoder parameter (e.g., a decoder model) each configured by a neural network.

The encoder parameter is a parameter for encoding a plurality of units in the input layer into a plurality of units in the intermediate layer.

The decoder parameter is a parameter for decoding a plurality of units in the intermediate layer into a plurality of units in the input layer.

When an image (e.g., an input image, input layer data) is input to the input layer of the autoencoder model, the input image becomes intermediate layer data (e.g., intermediate data) compressed by the encoder parameter. The intermediate layer data is decoded into an image (e.g., an output image, output layer data) having the same number of pixels as that the input layer data of the input layer by the decoder parameter and is output from the output layer. Thus, according to the autoencoder model, the information compression result can be obtained in the intermediate layer.

In the autoencoder model, learning is performed based on the learning data so that the data of the output layer (e.g., an output image) matches the data of the input layer (e.g., an input image) as much as possible. That is, as for the encoder parameter and the decoder parameter of the autoencoder model, the parameter (e.g., bias and weight) of the transition from the unit to the unit is updated by the learning device so that the difference between the input image and the output image becomes small.

The updated encoder parameters are reflected in the encoder 28 mounted on the image forming apparatus 11. Accordingly, the encoder 28 can encode the input image by the encoding method corresponding to the autoencoder model and output the intermediate layer data.

Also, the updated decoder parameters are reflected in the decoder 43 installed in the cloud server 12. As a result, the decoder 43 can decode the intermediate layer data by a decoding method corresponding to the autoencoder model and output an output image whose appearance almost matches that of the input image.

The image forming apparatus 11 and the cloud server 12 are configured to support a plurality of different autoencoder models. That is, the encoder 28 of the image forming apparatus 11 can encode image data by any of a plurality of encoding methods corresponding to a plurality of different autoencoder models. Further, the decoder 43 of the cloud server 12 can decode the intermediate layer data by any of a plurality of decoding methods corresponding to the plurality of different autoencoder models.

In at least one embodiment, the encoder 28 is configured to be able to perform encoding by any of a first encoding method corresponding to a first autoencoder model, a second encoding method corresponding to a second autoencoder model, and a third encoding method corresponding to a third autoencoder model.

Also, the decoder 43 is configured to be able to perform decoding by any of a first decoding method corresponding to the first autoencoder model, a second decoding method corresponding to the second autoencoder model, and a third decoding method corresponding to the third autoencoder model.

The above first autoencoder model is a model for performing OCR processing based on the output image in the cloud server 12. In the first autoencoder model, the number of units in the intermediate layer is set so that an image with precision required for OCR processing in the cloud server 12 can be output.

The above second autoencoder model is a model for performing high-precision OCR processing based on the output image in the cloud server 12. In the second autoencoder model, the number of units in the intermediate layer is set so that an image with the precision required for the high-precision OCR processing in the cloud server 12 can be output. High-precision OCR processing requires higher resolution images than normal OCR processing. Therefore, the second encoder model is set to have a larger number of units (e.g., data capacity) of the intermediate layer data than that of the first encoder model. As a result, the second autoencoder model can output an output image with high precision (e.g., high reproducibility) required for high-precision OCR processing.

Further, the third autoencoder model is a model for performing OCR processing based on the output image in the cloud server 12 and correcting the OCR processing result by the operator (e.g., using an operator entry). In the operator entry, since the operator checks the output image and corrects the OCR processing result, the precision of the output image may be minimum. Therefore, in the third autoencoder model, the number of units in the intermediate layer is set so that the image with the minimum precision in the cloud server 12 can be output. Therefore, the third encoder model is set to have a smaller number of units (e.g., data capacity) of intermediate layer data than that of the first encoder model. As a result, the third autoencoder model can minimize the capacity of the intermediate layer data.

Figure 3:
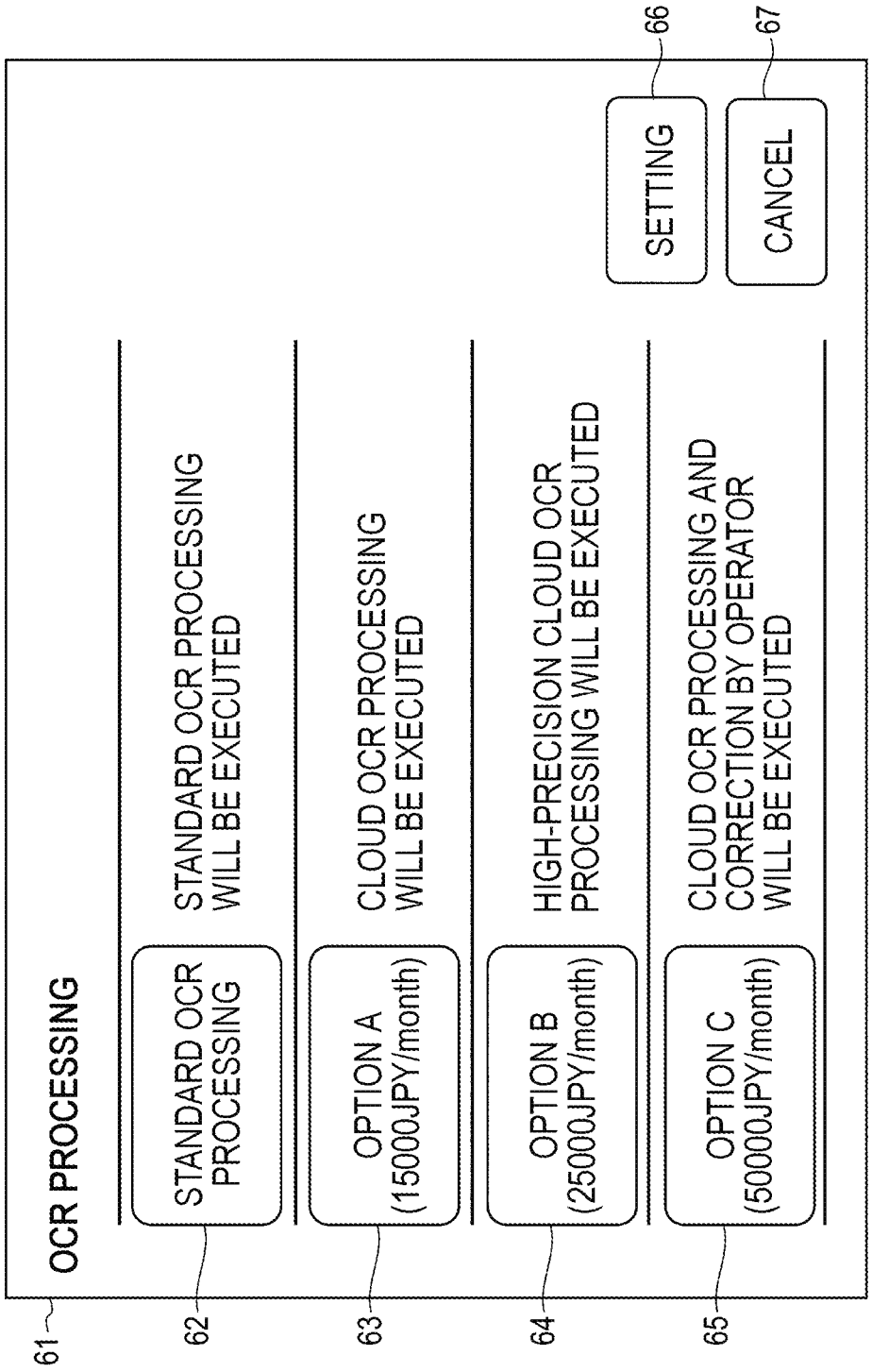
FIG. 3 is an explanatory diagram illustrating an example of a screen regarding OCR processing displayed on the image forming apparatus.

Next, a method of determining the type of OCR processing to be executed by the cloud server 12 will be described. FIG. 3 is an explanatory diagram for illustrating an example of a screen regarding the OCR processing displayed on the image forming apparatus 11.

The processor 31 of the system controller 21 of the image forming apparatus 11 causes the display 23 to display an OCR processing selection screen 61 shown in FIG. 3. The processor 31 determines OCR processing to be executed by the cloud server 12 and an autoencoder model (e.g., an encoding method) used for the encoding in accordance with an operation on the OCR processing selection screen 61.

On the OCR processing selection screen 61, a "standard OCR processing" button 62, an "option A" button 63, an "option B" button 64, an "option C" button 65, a "setting" button 66, and a "cancel" button 67, and the like are displayed.

The "standard OCR processing" button 62 is a button for selecting the execution of OCR processing by the image forming apparatus 11. When the "standard OCR processing" button 62 is selected, the processor 31 executes the OCR processing based on the acquired image data, using the OCR algorithm recorded in the memory 32 in advance.

The "option A" button 63 is a button for selecting the execution of OCR processing by the cloud server 12. When the "option A" button 63 is selected, the processor 31 encodes the acquired image data by the first decoding method corresponding to the first auto-encoder model to generate intermediate layer data (e.g., at a medium data capacity). The processor 31 transmits the intermediate layer data and the model information indicating the first encoding method used for the encoding to the cloud server 12.

When the processor 51 of the system controller 41 of the cloud server 12 receives the intermediate layer data and the model information indicating the first encoding method, the processor 51 decodes the intermediate layer data using the first decoding method to obtain an output image. The processor 51 performs OCR processing on the output image and transmits the OCR processing result to the image forming apparatus 11.

The "option B" button 64 is a button for selecting the execution of high-precision OCR processing by the cloud server 12. When the "option B" button 64 is selected, the processor 31 encodes the acquired image data by the second decoding method corresponding to the second autoencoder model to generate the intermediate layer data (e.g., at a high data capacity). The processor 31 transmits the intermediate layer data and the model information indicating the second encoding method used for the encoding to the cloud server 12.

When the processor 51 of the system controller 41 of the cloud server 12 receives the intermediate layer data and the model information indicating the second encoding method, the processor 51 decodes the intermediate layer data using the second decoding method to obtain a highly reproducible output image. The processor 51 performs high-precision OCR processing on the output image and transmits the high-precision OCR processing result to the image forming apparatus 11.

The "option C" button 65 is a button for selecting the execution of OCR processing+operator entry by the cloud server 12. When the "option C" button 65 is selected, the processor 31 encodes the acquired image data by the third decoding method corresponding to the third autoencoder model to generate the intermediate layer data (e.g., at a low data capacity). The processor 31 transmits the intermediate layer data and the model information indicating the third encoding method used for the encoding to the cloud server 12. The processor 31 may additionally transmit to the cloud server 12 a request for an operator to check (e.g., review) an output image and/or an OCR processing result generated by the cloud server 12 based on the intermediate layer data.

When the processor 51 of the system controller 41 of the cloud server 12 receives the intermediate layer data and the model information indicating the third encoding method, the processor 51 decodes the intermediate layer data using the third decoding method to acquire an output image. The processor 51 performs OCR processing on the output image and outputs the OCR processing result and the output image to the terminal of the operator. The operator checks the output image and the OCR processing result and operates the terminal to correct the OCR processing result. The processor 51 transmits the corrected OCR processing result to the image forming apparatus 11.

The "setting" button 66 is a button for making various settings regarding OCR processing.

The "cancel" button 67 is a button for canceling the OCR processing and returning to the home screen or the like.

The "OCR processing", "high-precision OCR processing", and "OCR processing+operator entry" in the cloud server 12 described above have different resources to be borne by the cloud side. Therefore, different charges are set for each. In the cloud server 12, the availability of each option is set for each image forming apparatus 11 or each account. The processor 31 of the system controller 21 of the image forming apparatus 11 can use the registered option service by logging in to the cloud server 12. For example, the processor 31 may not display the button corresponding to the unregistered option on the OCR processing selection screen 61.

Further, the image forming apparatus 11 may determine the type of OCR processing to be executed by the cloud server 12 on the above screen not based on the operation on the above screen, but based on another method.

For example, the image forming apparatus 11 may have setting items such as "cost priority", "precision priority", "communication load priority", and "balance". The processor 31 of the system controller 21 of the image forming apparatus 11 may be configured to select one of the "standard OCR processing", the "option A", the "option B", and the "option C" based on these settings and the service registration status.

For example, when "cost priority" is selected, the processor 31 selects "standard OCR processing" that requires the least cost. When "precision priority" is selected, the processor 31 selects "option B (high-precision OCR processing)". When "communication load priority" is selected, the processor 31 selects "option C (OCR processing+operator entry)". When "balance" is selected, the processor 31 selects "option A (OCR processing)".

At least the encoder 28 of the image forming apparatus 11 and the decoder 43 of the cloud server 12 support the first autoencoder model and the second autoencoder model in which the capacity of the intermediate layer data is larger than that of the first autoencoder model. The processor 31 determines the required precision of the OCR processing based on the operation of the operation interface 24, and if the required precision is low, the processor 31 controls the encoder 28 to encode the image data by a first encoder method corresponding to the first autoencoder model. Further, if the required precision is high, the processor 31 controls the encoder 28 to encode the image data by a second encoder method corresponding to the second autoencoder model.

Next, operations of the image forming apparatus 11 and the cloud server 12 will be described.

Figure 4:
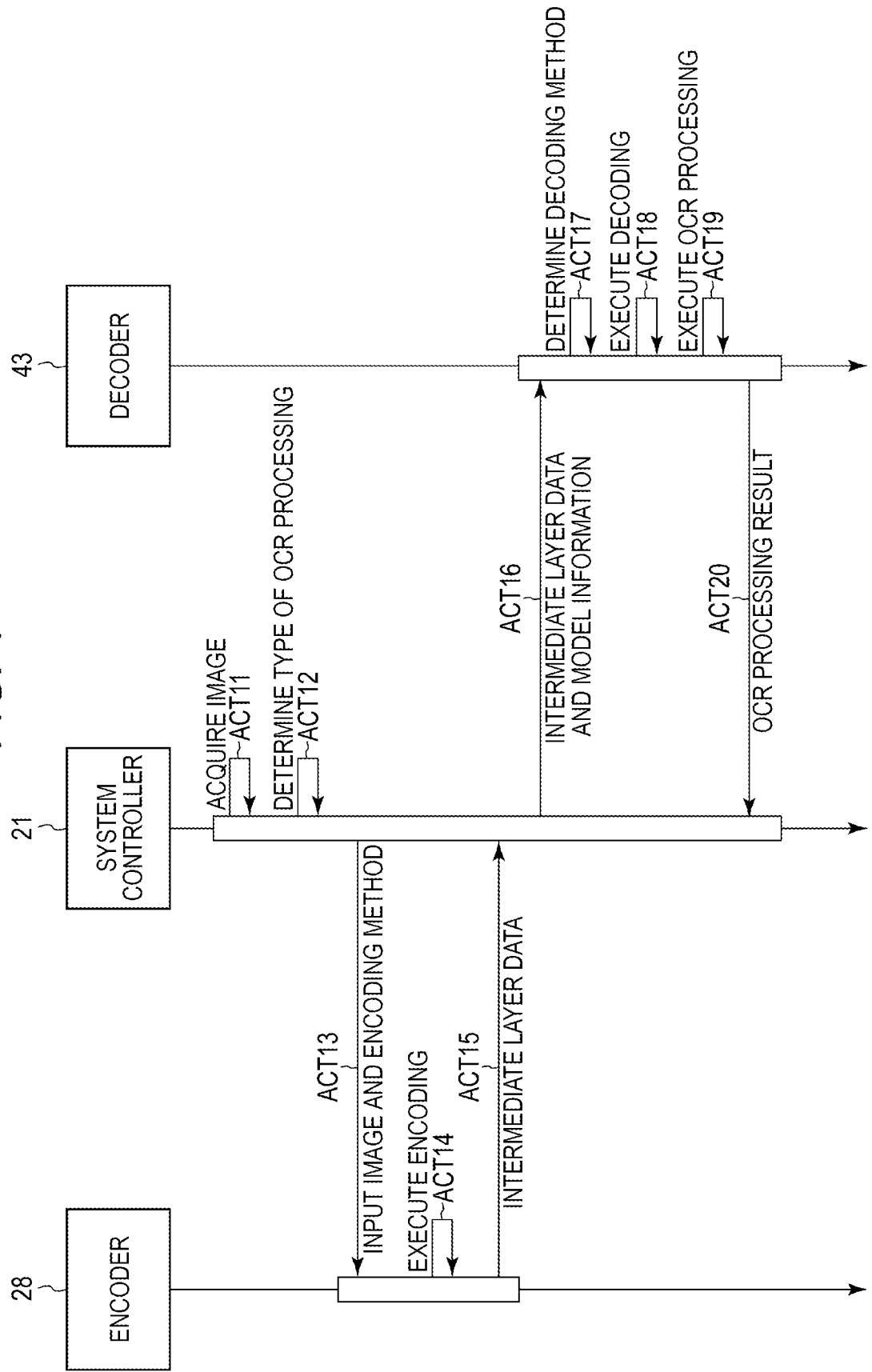
FIG. 4 is an explanatory diagram illustrating operations in the image forming apparatus and the cloud server.

FIG. 4 is a sequence diagram for illustrating the operations of the image forming apparatus 11 and the cloud server 12.

First, the processor 31 of the system controller 21 of the image forming apparatus 11 acquires an image (e.g., an input image) to be subjected to OCR processing (ACT 11). For example, the processor 31 acquires the input image to be subjected to the OCR processing by the image reading unit 25. Further, for example, the processor 31 may acquire the input image to be subjected to the OCR processing from the client PC via the communication interface 22.

The processor 31 determines the type of OCR processing (ACT 12). For example, the processor 31 determines the type of OCR processing from "standard OCR processing", "option A", "option B", and "option C" based on the operation of the OCR processing selection screen 61 of FIG. 3 or the setting.

The processor 31 transmits the information specifying the input image and the encoding method to the encoder 28

(ACT 13). The processor 31 specifies the encoding method according to the type of OCR processing determined in ACT 12. For example, the processor 31 specifies the first encoding method when "Option A" is selected as the type of OCR processing in ACT 12. In addition, for example, the processor 31 specifies the second encoding method when "Option B" is selected as the type of OCR processing in ACT 12. Further, for example, the processor 31 specifies the third encoding method when the "option C" is selected as the type of OCR processing in ACT 12.

The encoder 28 of the image forming apparatus 11 encodes the input image transmitted from the processor 31 by the encoding method specified by the processor 31 (ACT 14). That is, the encoder 28 inputs the input image into the encoder model specified by the processor 31 and acquires the intermediate layer data.

The encoder 28 transmits the acquired intermediate layer data to the system controller 21 (ACT 15).

When the processor 31 of the system controller 21 receives the intermediate layer data from the encoder 28, the processor 31 transmits the model information indicating the encoding method instructed to the encoder 28 in ACT 13 and the intermediate layer data to the cloud server 12 via the communication interface 22 (ACT 16).

The processor 51 of the system controller 41 of the cloud server 12 determines a decoding method to be executed by the decoder 43 based on the model information received from the image forming apparatus 11 (ACT 17). For example, the processor 51 determines to cause the decoder 43 to execute the first decoding method when the model information indicates the first encoding method, determines to cause the decoder 43 to execute the second decoding method when the model information indicates the second encoding method, and determines to cause the decoder 43 to execute the third decoding method when the model information indicates the third encoding method.

The processor 51 instructs the decoder 43 in the decoding method and transmits the intermediate layer data received from the image forming apparatus 11 to the decoder 43 to execute the decoding (ACT 18). The decoder 43 decodes the intermediate layer data by the decoding method specified by the processor 51 and transmits the output image to the processor 51.

The processor 51 executes the OCR processing according to the model information based on the output image received from the decoder 43 (ACT 19). For example, the processor 51 executes normal OCR processing when the model information indicates the first encoding method. In addition, the processor 51 executes high-precision OCR processing when the model information indicates the second encoding method. Further, the processor 51 executes OCR processing and the operator entry when the model information indicates the third encoding method. When the OCR processing is completed, the processor 51 transmits the OCR processing result to the image forming apparatus 11 (ACT 20).

As described above, the image forming apparatus 11 includes the communication interface 22, the encoder 28, and the processor 31. The communication interface 22 communicates with the cloud server 12 that performs decoding by any of a plurality of decoding methods corresponding to a plurality of autoencoder models. The encoder 28 executes encoding by any of a plurality of encoding methods corresponding to the plurality of autoencoder models. The processor 31 specifies an encoding method to the encoder 28 to encode the image data into intermediate layer data that can be decoded by the cloud server 12. Further, the processor 31 can transmit the intermediate layer data and model information indicating the encoding method used for the encoding to the cloud server 12 via the communication interface 22 and decode the intermediate layer data into an output image.

According to this configuration, when transmitting image data to the cloud server 12, the image forming apparatus 11 can encode and transmit the intermediate layer data, which has a very small data capacity compared to the input image. As a result, the image forming apparatus 11 can reduce the communication load.

Further, the image data is an image including characters, and the processor 31 acquires, from the cloud server 12, the result of the OCR processing executed on the output image acquired by the cloud server 12 decoding the intermediate layer data. As a result, the processor 31 can reduce the communication load and cause the cloud server 12 to execute the OCR processing.

Further, the processor 31 determines the type of OCR processing to be executed by the cloud server 12 based on the operation of the operation interface 24 and determines the encoding method to be executed by the encoder 28 according to the determined type of OCR processing.

For example, the autoencoder model supported by the encoder 28 of the image forming apparatus 11 and the decoder 43 of the cloud server 12 includes at least a first autoencoder model and a second autoencoder model in which the capacity of the intermediate layer data is larger than that of the first autoencoder model. The processor 31 determines the required precision of the OCR processing based on the operation of the operation interface 24 and controls the encoder 28 to encode the image data by the first encoder method corresponding to the first autoencoder model if the required precision is low. Further, if the required precision is high, the processor 31 controls the encoder 28 to encode the image data by the second encoder method corresponding to the second autoencoder model.

As a result, the image forming apparatus 11 can select the communication load and the precision of the OCR processing according to the user's intention.

The functions described in each of the above-described embodiments are not limited to being configured by using hardware and can be implemented by using software to load a program describing each function into a computer. Further, each function may be configured by appropriately selecting either software or hardware.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a communication interface configured to communicate with a cloud server that performs decoding by any of a plurality of decoding methods corresponding to a plurality of autoencoder models;
   an encoder configured to perform encoding by any of a plurality of encoding methods corresponding to the plurality of autoencoder models;
   a user interface; and
   a processor configured to:

determine a type of OCR processing to be executed by the cloud server based on an operation of the user interface;
determine an encoding method to specify according to the determined type of OCR processing;
specify the encoding method to the encoder to encode image data into intermediate layer data that is configured to be decoded by the cloud server, the image data including an image including characters;
transmit (a) the intermediate layer data and (b) model information indicating the specified encoding method to the cloud server through the communication interface; and
acquire, from the cloud server and through the communication interface, a result of OCR processing executed on an output image acquired by the cloud server by decoding the intermediate layer data.

2. The image forming apparatus of claim 1, wherein:
the plurality of autoencoder models include at least a first autoencoder model and a second autoencoder model;
a capacity of the intermediate layer data in the second autoencoder model is larger than a capacity of the intermediate layer data in the first autoencoder model, and
the processor is configured to:
determine a required precision of the OCR processing based on the operation of the user interface;
control the encoder to encode the image data using a first encoding method corresponding to the first autoencoder model in response to a determination that the required precision is low; and
control the encoder to encode the image data using a second encoding method corresponding to the second autoencoder model in response to a determination that the required precision is high.

3. The image forming apparatus of claim 1, wherein:
the plurality of autoencoder models include at least a first autoencoder model and a second autoencoder model;
a capacity of the intermediate layer data in the second autoencoder model is larger than a capacity of the intermediate layer data in the first autoencoder model; and
the processor is configured to:
control the encoder to encode the image data using a first encoding corresponding to the first autoencoder model in response to a first user input; and
control the encoder to encode the image data using a second encoding method corresponding to the second autoencoder model in response to a second user input.

4. The image forming apparatus of claim 3, wherein:
the plurality of autoencoder models further include a third autoencoder model;
a capacity of the intermediate layer data in the third autoencoder model is smaller than the capacity of the intermediate layer data in the first autoencoder model and the capacity of the intermediate layer data in the second autoencoder model; and
the processor is configured to control the encoder to encode the image data using a third encoding method corresponding to the third autoencoder model in response to a third user input.

5. The image forming apparatus of claim 4, wherein, in response to the third user input, the processor is configured to transfer, to the cloud server, a request for an operator to review an OCR processing result generated by the cloud server based on the transferred intermediate layer data.

6. The image forming apparatus of claim 3, wherein:
the plurality of autoencoder models further include a third autoencoder model; and
the processor is configured to:
control the encoder to encode the image data using a third encoding method corresponding to the third autoencoder model in response to a third user input; and
transfer, to the cloud server and in response to the third user input, a request for an operator to review an OCR processing result generated by the cloud server based on the transferred intermediate layer data.

7. The image forming apparatus of claim 1, further comprising:
a scanner configured to acquire an image of a first sheet and generate the image data based on the image; and
a printer configured to form an image on a second sheet.

8. An image forming apparatus comprising:
a communication interface configured to communicate with a cloud server that performs decoding by any of a plurality of decoding methods corresponding to a plurality of autoencoder models, the plurality of autoencoder models including at least a first autoencoder model and a second autoencoder model;
an encoder configured to perform encoding by any of a plurality of encoding methods corresponding to the plurality of autoencoder models,
the plurality of encoding methods including a first encoding method corresponding to the first autoencoder model and a second encoding method corresponding to the second autoencoder model;
the plurality of encoding methods each being configured to encode image data into intermediate layer data that is configured to be decoded by the cloud server; and
a capacity of the intermediate layer data in the second autoencoder model being larger than a capacity of the intermediate layer data in the first autoencoder model; and
a processor configured to:
provide an indication to a user that utilizing the second encoding method will incur a greater cost than utilizing the first encoding method;
control the encoder to encode the image data using the first encoding method in response to a first user input;
control the encoder to encode the image data using the second encoding method in response to a second user input; and
transmit (a) the intermediate layer data and (b) model information indicating the specified encoding method to the cloud server through the communication interface.

9. A method of controlling an image forming apparatus including a communication interface, an encoder, and a processor, the method comprising:
establishing, by the communication interface, communication with a cloud server that executes decoding by any of a plurality of decoding methods corresponding to a plurality of autoencoder models;
determining, by the processor, a type of OCR processing to be executed by the cloud server based on a user input;
determining, by the processor, an encoding method to specify according to the determined type of OCR processing, the encoding method corresponding to one of the plurality of autoencoder models;

specifying, by the processor, the determined encoding method;

encoding, by the encoder, image data into intermediate layer data according to the specified encoding method, wherein the intermediate layer data is configured to be decoded by the cloud server and the image data includes an image including characters;

transmitting, through the communication interface, (a) the intermediate layer data and (b) model information indicating the specified encoding method to the cloud server; and acquiring, through the communication interface, a result of OCR processing executed on an output image acquired by the cloud server by decoding the intermediate layer data.

10. The method of claim 9, wherein:

the plurality of autoencoder models include at least a first autoencoder model and a second autoencoder model;

a capacity of the intermediate layer data in the second autoencoder model is larger than a capacity of the intermediate layer data in the first autoencoder model; and the method further comprises:

determining, by the processor, a required precision of the OCR processing based on the user input;

encoding, by the encoder, the image data using a first encoding method corresponding to the first autoencoder model in response to a determination that the required precision is low; and encoding, by the encoder, the image data using a second encoding method corresponding to the second autoencoder model in response to a determination that the required precision is high.

* * * * *